Feb. 7, 1961    J. S. SHULZ    2,970,879
DRILLING RECORDING CHART HOLDER
Filed April 11, 1957

INVENTOR.
JACK S. SHULZ
BY Philip H. Sheridan
ATTORNEY

United States Patent Office 2,970,879
Patented Feb. 7, 1961

2,970,879

DRILLING RECORDING CHART HOLDER

Jack S. Shulz, Denver, Colo., assignor to Eastman Oil Well Survey Company, a corporation of Delaware Filed Apr. 11, 1957, Ser. No. 652,296

5 Claims. (Cl. 346—138)

This invention relates to an improved sheet or chart holder whereby the chart may be accurately maintained on a desired surface and yet may be readily removed therefrom and/or replaced with another chart. More particularly, the invention relates to a holder for time sheets or log charts of the type used in well drilling recording apparatus and which is to be maintained on the exterior surface of a rotatably mounted drum of the apparatus.

Reference is made to pending U.S. patent applications Serials Nos. 462,833, now U.S. Patent No. 2,860,509, and 570,116, both in the name of Oliver V. Phillips and entitled "Recording Apparatus for Earth Bore Drilling" and "Recording Apparatus and Method for Use With Well Drilling Equipment," respectively, the entire right, title and interest in said applications and the present invention being owned by a common assignee. In both of said applications there is disclosed a time sheet or log chart upon which is recorded relative to time indicia on the chart information concerning well drilling apparatus, such as rate of penetration and operations that take place in the well other than drilling. The chart holder of the present invention is particularly designated for use with such log charts and thus the said applications will constitute references in this sense.

Generally, such log sheets as well as the size of the drum upon which they are mounted are constructed so that the drum will rotate once during a twelve hour period, at which time the recording space on the chart has been fully utlized and a new chart must be substituted for the next day's operation, or for the following twelve hours of drilling. Thus it is desirable to have a means for accurately maintaining the chart in place on the drum so that the recordings will be accurately reflected relative to the proper time indicia and yet, due to the frequency of changes that are necessary, it is desirable to have a chart holder which may be readily and simply operated to permit removal of the used chart and substitution of a new one. It is one of the primary objetcs of this invention to provide a chart holder having such characteristics.

It is another object of this invention to provide a chart holder of the type described which is simple in construction, is composed of a minimum of parts, and which insures accurate positioning of the chart on the drum.

A further object is to provide a chart holder which may be manually operated with ease to permit changing of charts and which occupies a minimum amount of space.

Other objects and advantages of the invention will become apparent upon considering the detailed description in conjunction with the drawings wherein like numerals represent similar parts throughout and wherein a preferred embodiment is illustrated and wherein.

Figure 1:
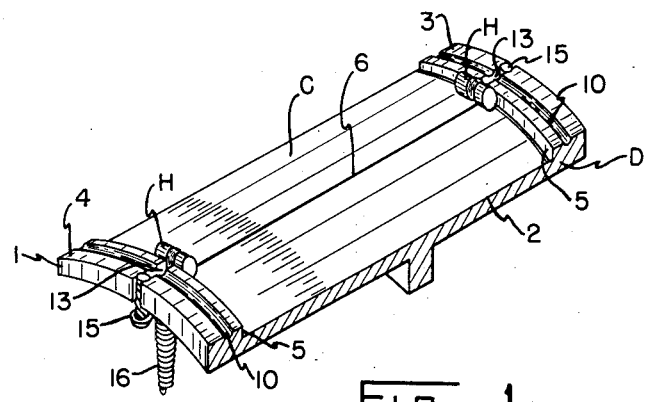
Figure 1 is a perspective view of a portion of a drum showing the present invention as holding a portion of the chart sheet thereon.

In the drawings numeral D represents a suitable chart drum and as in said pending applications this drum includes a conventional spring loader plunger assembly whereby the drum may be detachably connected between bearings and a clock shaft for rotation with the latter, whereby preferably the drum makes one complete rotation during, for example, a twelve hour period. Drum D has a hollow and cylindrical main body 1 including a relatively flat annular exterior surface 2 and raised cylindrical edges 3 and 4. The edges and the surface form shoulders 5 preferably spaced apart a distance only slightly greater than the width of the chart C to thus aid in wrapping and positioning the chart C in place on the surface 2. The time sheet or log chart C has time indicia thereon and as explained in said applications drilling information is to be recorded thereon with respect to time by means of one or more styli or pens which are biased into engagement with said chart C during recording. Also it is common practice to have the chart C of such a size that the ends thereof, when the chart is wrapped around the drum surface 2, either abut each other or preferably overlap, the latter being illustrated at 6 in Figure 1 and constituting the terminal point of the top end of the overlap and, as defined in the claims, the point of abutment. In the past the chart C has been held in place on the surface 2 by means of spring biased hooks or the like and generally such has been found to be unsatisfactory, due to various reasons such as the difficulty involved in operating the hooks, the fact that they tend to cut the chart and occupy considerable space and the fact that they do not insure proper positioning of the chart C on the drum surface.

The chart holder of the present invention has been designed for simplicity of operation and to insure proper maintenance of the chart C on surface 2. It will be noted by referring to Figure 1 that there is illustrated two chart holders generally represented by the letter H, the overlap point 6 of the chart when wrapped about the drum 1 being positioned in substantially transverse alignment with the holders H. Since both holders H are identical, only one will be described in detail, and of course it is highly desirable that the two holders H shown in Figure 1 be utilized in connection with positioning a chart C.

Figure 2:
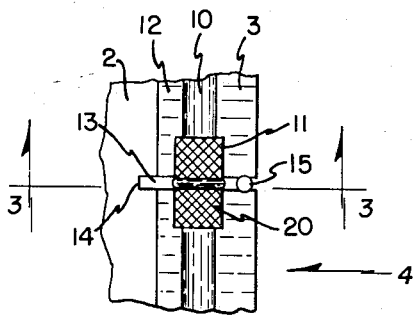
Figure 2 is a plan view of one of the chart holders illustrated in Figure 1 and including a small portion of the drum.
Figure 3:
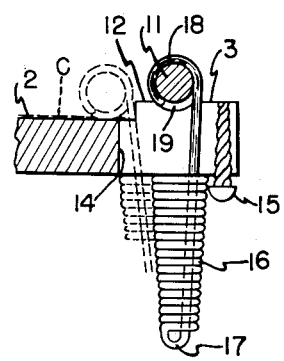
Figure 3 is a view taken along the lines 3—3 of Figure 2.
Figure 4:
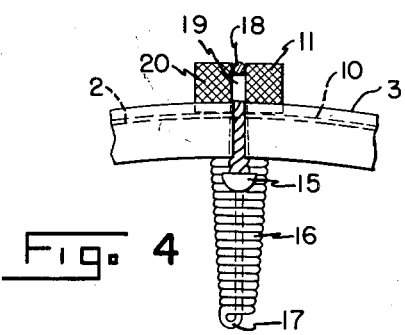
Figure 4 is a side elevational view taken in the direction of the arrow of Figure 2 and showing the loop 18 broken away.

Considering in particular Figures 2, 3 and 4, edge 3 is provided with an area in the form of a track or recess 10 at least of a longitudinal size to receive a roller-like member 11 of substantial cylindrical configuration. For manufacturing reasons recess 10 is provided in the form of a complete annulus. It will be noted that the recess 10 forms with surface 2, in effect, a divided partition 12 which, as will be apparent hereinafter, functions as stop means over which a roller 11 rides. Passing through recess 10, the edge 3 and part of the drum body 1 is a vertical slot 13. At one end this slot 13 is closed as at 14 and at the other end it is open except for a drive screw 15 which is positioned therein and which functions to prevent, as will be apparent hereinafter, the holder assembly H from being moved off of the drum. Of course, the slot 13 could be closed at its other end, but from a manufacturing standpoint the use of drive screw 15, or equivalent means, is preferred.

At slot 13 there is positioned underneath the body 1 at edge 3 a coiled spring 16 which, as shown, is constructed so that the convolution at one end thereof is positioned on the under surface of body 1 and the convolutions from this end to the other end taper downwardly whereby at the other terminal convolution the end 17 of the spring is extended to pass through all convolutions, as clearly shown in Figure 3, and through slot 13. At its terminal point the end 17 is looped as at 18 and this loop is received in an annular groove 19 provided substantially in the center of roller member 11, the loop 18 functioning, as is apparent, to bias or hold the roller 11 against the drum D.

In operation let it be assumed that a fresh chart C is to be positioned on surface 2 and at this time each holder H would be as shown in Figure 3 with the spring 16 biasing the roller 11 into recess 10 and maintaining it therein. After the chart C has been properly positioned and the ends thereof overlap as at terminal point 6 which is in substantial transverse alignment with the holder assemblies H, the rollers 11 are manually caused to ride over, against their spring tension 16, the stop means 12 until they fall onto surface 2, whereupon the rollers are spring biased downwardly on top of chart C to insure the chart being maintained in proper position. During this movement each spring 16 generally moves to the dotted line position as illustrated in Figure 3 or some distorted position between those shown in Figure 3. Thus the chart C is properly positioned and maintained on the surface 2, and after another twelve hour period it is merely necessary to manually snap the rollers 11 over the stop means 12 into recesses 10 and it will be noted that the rollers cannot escape the edges 3 due to the drive screws 15. For convenience only, the outside cylindrical surfaces of the rollers are knurled as at 20 to assist finger gripping thereof.

It is believed from the foregoing description that there has been invented a chart holder which achieves the objects enumerated. Being aware of possible modifications in structure, it is to be understood that the scope of the invention is not to be limited except in accordance with the appended claims and equivalents thereof. For example, recess 10 may take other shapes and as a matter of fact the recess 10 side of stop means 12 could be identical with the chart side with screw 15 being raised to prevent assembly H from being moved off the drum.

What is claimed is:

1. A chart holder for use in connection with a chart mountable on a hollow cylindrical drum having a relatively flat annular exterior surface upon which the chart is wrapped with the ends of the chart at least abutting each other with the chart so wrapped, cylindrical edges on each side of said surface, said holder comprising a transverse slot extending inwardly from at least one edge of the drum, a roller-like member transversely movable relative to the chart from a first position for engagement with the chart and to a second position on the edge whereby the chart may be removed from the surface, spring means for maintaining the member on and against the drum by biasing the member against the drum in both positions and during movement thereof, said spring means being positioned beneath the edge except for one end thereof which extends through the slot and is connected with the member, said edge having stop means at the point of said slot and a member receiving area on the side of said stop means opposite the surface whereby the roller member is manually movable to ride over the stop means onto said area when in said second position and onto said chart when in said first position, said slot and member being positioned relative to the wrapped chart so that the roller member is movable onto the point of abutment of the chart ends.

2. Apparatus as defined in claim 1 wherein there is provided means for preventing the roller-like member from being moved off the drum and the end of the spring means from leaving its slot.

3. Apparatus as defined in claim 1 wherein the stop means is in the form of a partition dividing the surface from the area, the member receiving area being in the form of a recess.

4. In combination, a cylindrical hollow drum and drilling recording chart holder apparatus therefor, said drum having a relatively flat annular exterior surface and cylindrical edges on each side of said surface, the drilling recording chart being positionable on and wrapped about the surface with the ends of said chart at least abutting each other with the chart so wrapped, comprising a slot in each edge of the drum in substantial transverse alignment with the point of abutment of the chart ends, a coiled spring at each edge having its convolutions beneath the edge and having the lower end of its convolutions extending upwardly through said convolutions and the slot for selective up and down movement in relation to said drum, a roller-like member connected with each of said ends whereby the roller members are maintained on and against the drum of biasing the members against the drum in both positions and during movement thereof, each edge having a stop at the point of said slot and a roller receiving recess on the side of each stop opposite the surface, each roller member being movable manually to ride over its respective stop from the recess on one side of the stop whereby each roller member is maintained disengaged from said chart to the surface on the other side of said stop whereby each member is positioned upon said chart to maintain the latter in place on said drum surface.

5. Apparatus as defined in claim 4 wherein each roller member, slot and spring is in substantial alignment transversely of the drum and with the point of abutment, and means for preventing each member from being removed from the drum and each spring end from leaving its respective slot.

References Cited in the file of this patent

UNITED STATES PATENTS

| | | |
|---|---|---|
| 190,117 | Boudeman | May 1, 1877 |
| 508,461 | Zellers | Nov. 14, 1893 |
| 1,458,713 | Levy | June 12, 1923 |
| 1,545,897 | Haynes | July 14, 1925 |